United States Patent
Geiser

(10) Patent No.: US 6,416,037 B1
(45) Date of Patent: Jul. 9, 2002

(54) VACUUM PIPE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/759,026

(22) Filed: Jan. 11, 2001

(51) Int. Cl.$^7$ ............................................... F16K 25/00
(52) U.S. Cl. .................... 251/158; 251/214; 277/634
(58) Field of Search .................. 251/63, 167, 158, 251/175, 176, 193, 214, 330; 277/628, 634, 635

(56) References Cited

U.S. PATENT DOCUMENTS

| | | | |
|---|---|---|---|
| 3,185,435 A | 5/1965 | Hauser | 251/158 |
| 4,560,141 A | 12/1985 | Bosch | 251/167 |
| 5,101,861 A * | 4/1992 | Deville et al. | 137/630.12 |
| 5,415,376 A | 5/1995 | Ito | 251/158 |
| 5,641,149 A | 6/1997 | Ito | 251/158 |
| 5,755,255 A | 5/1998 | Iwabuchi | 137/341 |
| 5,934,646 A | 8/1999 | Tamura et al. | 251/193 |
| 6,045,117 A | 4/2000 | Tamura et al. | 251/193 |
| 6,056,266 A | 5/2000 | Blecha | 251/158 |
| 6,056,267 A * | 5/2000 | Schneider | 251/193 |
| 6,082,706 A | 7/2000 | Irie | 251/158 |
| 6,095,180 A | 8/2000 | Ishigaki et al. | 137/341 |

FOREIGN PATENT DOCUMENTS

| | | | |
|---|---|---|---|
| DE | 32 09 217 | 10/1985 | F16K/51/02 |
| DE | 32 24 387 | 5/1987 | F16K/51/02 |
| DE | 196 33 798 | 2/1998 | F16L/55/10 |
| EP | 1 028 278 | 8/2000 | F16K/1/46 |

* cited by examiner

*Primary Examiner*—William Doerrler
*Assistant Examiner*—Patrick Buechner
(74) *Attorney, Agent, or Firm*—Reed Smith LLP

(57) ABSTRACT

A vacuum pipe for a part which is mounted so as to be movable and projects from outside a vacuum chamber into a vacuum in the vacuum chamber, comprises an opening in a wall of the vacuum chamber limiting the vacuum, with an inner side facing the vacuum and an outer side at which is provided an annular sealing surface surrounding the opening, an annular sealing surface at the part projecting through the opening into the vacuum from outside the vacuum, a sealing arrangement which is provided between the annular sealing surfaces of the wall and of the part and which comprises at least one sealing ring of elastic material, and a guide device which guides the part relative to the wall and by which at least a minimum axial pressing force is maintained on the at least one sealing ring in every position of the part, resulting in a deformation of the at least one sealing ring such that tightness is ensured, wherein the deformation of the sealing ring changes at least in areas of the sealing ring when the part moves relative to the wall.

11 Claims, 4 Drawing Sheets

VACUUM PIPE

BACKGROUND OF THE INVENTION a) Field of the Invention

The invention is directed to a vacuum leadthrough or vacuum pipe for a part which is mounted so as to be movable and projects from outside a vacuum chamber into a vacuum in the vacuum chamber. The invention is further directed to a vacuum valve with a vacuum pipe of the type mentioned above.

b) Description of the Related Art

Vacuum pipes are used for different applications in which there are movable parts projecting from outside the vacuum into the vacuum. Parts of this type are, for example, manipulators which are used for manipulation carried out in a vacuum from the outside. Vacuum pipes are also used in vacuum valves. A commonly used vacuum valve of this type is the plate valve, as it is called, in which a valve opening is closed by a valve plate fastened to a valve rod. The valve rod is guided by means of a vacuum pipe out of the vacuum, where an actuating device is provided for the valve rod to open and close the plate valve. Vacuum valves of this type are known, for example, from U.S. Pat. No. 5,415,376 A, U.S. Pat. No. 5,641,149 A, U.S. Pat. No. 6,045,117 A, U.S. Pat. No. 5,934,646 A, U.S. Pat. No. 5,755,255 A, U.S. Pat. No. 6,082,706 A and U.S. Pat. No. 6,095,180 A.

Bellows or diaphragm bellows are often used to seal vacuum pipes. Besides linear movements, these bellows also allow tilting movements and are absolutely tight. Bellows are disadvantageous because of their relatively large dimensions, relatively high manufacturing cost and their somewhat time-consuming assembly when installed in the system. Bellows also have relatively large inner surfaces which can result in unwanted depositing of particles that can be released in part when the bellows move. This release of particles can result in impairment of high-purity surfaces, for example, in wafer handling.

When only linear movements in axial direction of the part extending into the vacuum are required, an O-ring can be used in a known manner for sealing between the wall and the part, this O-ring being arranged at the surface of the wall defining the opening so as to contact the outer surface of the part passing through the opening. When this part is displaced, the O-ring slides along the outer surface of the part. Accordingly, friction always occurs in a seal of this kind, resulting in wear of the O-ring and in the release of particles. Further, a lubrication of the seal is usually required.

OBJECT AND SUMMARY OF THE INVENTION

It is the primary object of the invention to provide a vacuum pipe in which no sliding friction occurs during a linear movement of the guided-through part and which does not require lubrication. A further object of the invention is to provide a vacuum pipe which is constructed in a simple manner and is easy to assemble and maintain. A further object of the invention consists in providing a vacuum pipe which does not cause unnecessary release of particles during a movement of the part that is guided through.

A vacuum pipe according to the invention comprises an opening in a wall limiting the vacuum, with an inner side facing the vacuum and an outer side at which is provided an annular sealing surface surrounding the opening, an annular sealing surface at the part projecting through the opening into the vacuum from outside the vacuum, a sealing arrangement which is provided between the annular sealing surfaces of the wall and of the part and which comprises at least one sealing ring of elastic material, and a guide device which guides the part relative to the wall and by means of which at least a minimum axial pressing force is maintained on the at least one O-ring in every position of the part resulting in a deformation of the at least one sealing ring such that tightness is ensured, wherein the deformation of the sealing ring changes at least in areas of the sealing ring when the part moves relative to the wall.

A vacuum pipe according to the invention can enable tilting movements of the guided-through part or smaller linear movements of this part or combined tilting and linear movements depending on the construction of the guide device. Examples of guide devices of this kind are described in more detail in the description of the drawings.

The opening in the wall can be circular or can have a different shape. The sealing surface which surrounds the opening in the wall can be circular or can have another circumferentially closed shape, for example, oval or rectangular with rounded corners. The annular sealing surface can likewise be constructed so as to be circular at the part projecting through the opening into the vacuum or can have another circumferentially closed shape, for example, oval or rectangular with rounded corners.

In a preferred embodiment example of the invention, two or more sealing rings of elastic material are provided, an inelastic intermediate ring being arranged therebetween, which intermediate ring has oppositely located lateral surfaces contacted by the sealing rings and forming sealing surfaces. The freedom of movement of the guided-through part can accordingly be increased for linear movements as well as tilting movements.

The various features and constructions according to the invention are indicated in the claims.

Further advantages and details of the invention are described in the following with reference to the embodiment examples shown in the drawings, further aims of the invention following therefrom.

DESCRIPTION OF THE PREFERRED EMBODIMENTS

Figure 1:
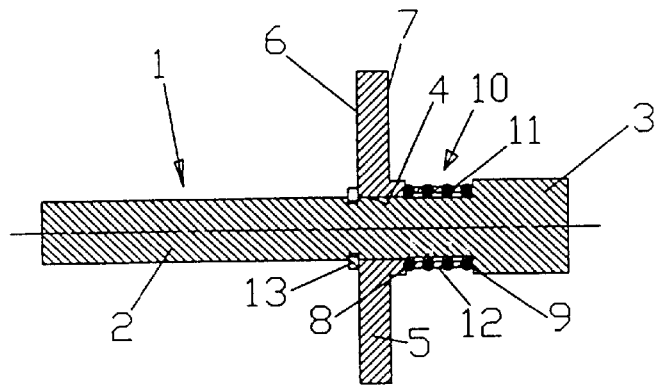
FIG. 1 shows a schematic longitudinal section through a first embodiment example of the invention.
Figure 2:
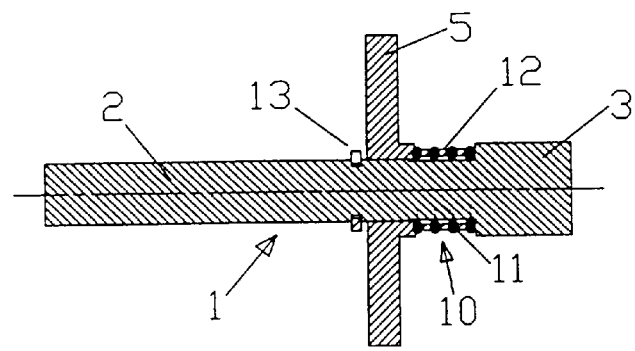
FIG. 2 shows a section corresponding to FIG. 1 with the guided-through part in a position in which it is displaced linearly in axial direction relative to FIG. 1.

The embodiment example of the invention which is shown schematically in FIGS. 1 and 2 shows a linear leadthrough for a manipulator. The guided-through part 1 comprises a manipulator rod 2 projecting into the vacuum and an actuating handle 3 which is arranged outside of the vacuum and is connected with the manipulator rod. The manipulator rod 2 projects through an opening 4 in a wall 5 defining the vacuum. This wall 5 which can form the outer wall of a process chamber, for example, has an inner side 6 facing the vacuum and an outer side 7. The outer surface of the opening 4 forms a guide surface for the manipulator rod 2 and surrounds it with slight clearance. The outer side 7 of the wall 5 is formed in a stepped manner in the area adjoining the opening 4, so that the thickness of the wall is increased and the guidance of the manipulator rod is improved.

A sealing surface 8 which surrounds the opening annularly and which is constructed so as to be circular in this embodiment example is provided at the outer side of the wall 5, namely, in the stepped region surrounding the opening. The actuating handle has a sealing surface 9 which is located across from sealing surface 8 and which, in the present embodiment example, is likewise circular. A sealing arrangement 10 which comprises four sealing rings in the form of O-rings 11 in the embodiment example according to FIG. 1 is arranged between the sealing surfaces 8 and 9. An intermediate ring 12, e.g., made of metal, is arranged between the O-rings 11 in each instance, which O-rings 11 rest against the opposite lateral surfaces of the intermediate ring 12. These lateral surfaces form sealing surfaces. A stop 13 which limits the axial displacement of the manipulator in outward direction is provided for further guiding of the movement of the manipulator rod 2 and is formed by a ring arranged in a groove in the manipulator rod 2.

In the fully outwardly displaced position shown in FIG. 1, an axial pressing force which acts on the O-rings 11 and which results in a minimum deformation of the O-rings 11 ensuring the tightness of the pipe is maintained by the guide device for the movement of part 1 which, in the present case, is the guide surface formed by the outer surface of the opening 4 in connection with the stop 13. In this position of part 1 corresponding to FIG. 1, the pressing force exerted on the O-rings 11 is minimal. When the part 1 is moved in the direction of the axially inwardly displaced position shown in FIG. 2 proceeding from the position corresponding to FIG. 1, the pressing force exerted on the O-rings 11 and, therefore, the deformation are increased. The displacement can be carried out up to the maximum possible deformation of the O-rings 11. The maximum possible deformation of the O-rings is defined by the applicable force on the one hand and by the material allowances of the O-rings on the other hand. A stop (not shown in FIG. 2) can be provided for limiting displacement.

While four sealing rings are shown, fewer than or more than four sealing rings could also be provided depending on the required displacement path, wherein an O-shaped cross section is preferred but is not compulsory. The intermediate rings 12 could also comprise a different inelastic material on which a sealing surface can be arranged.

Figure 3:
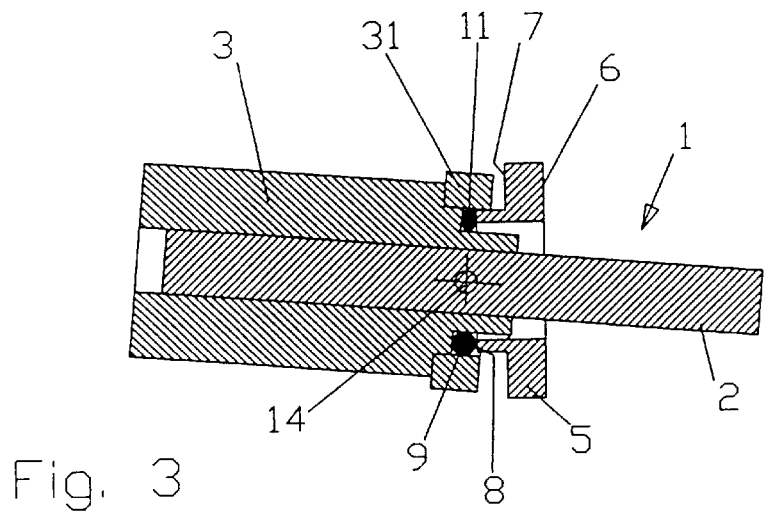
FIG. 3 shows a schematic longitudinal section through a second embodiment example of the invention.
Figure 4:
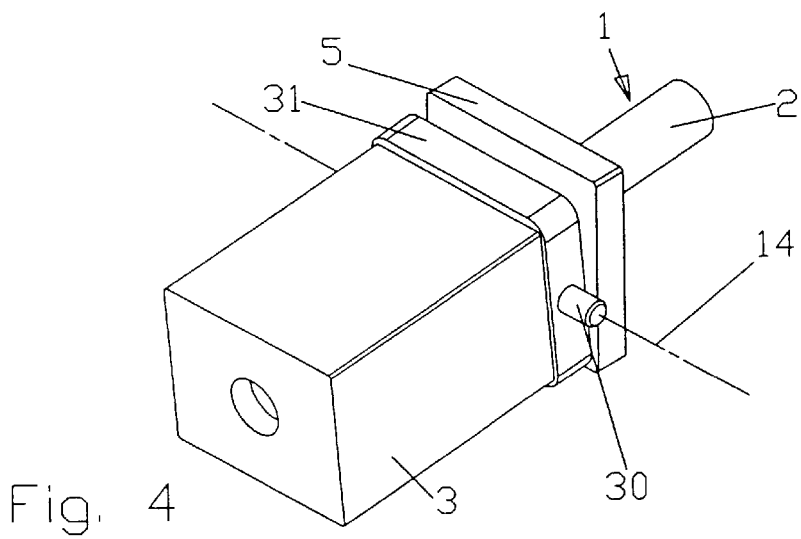
FIG. 4 shows a schematic perspective view of this second embodiment example of the invention.

In the embodiment example shown in FIGS. 3 and 4, a tilting leadthrough of a manipulator is shown schematically. The diameter of the opening is larger than the diameter of the manipulator rod 2 in order to enable tilting or swiveling of the manipulator rod. The swivel axis 14 is only indicated schematically in FIG. 3. It can be formed, for example, by pins 30 at the manipulator which are arranged on opposite sides of a guide part 31 connected with the actuation handle 3 and which project into corresponding recesses of a guide part (not shown in FIGS. 3 and 4) connected with the wall 5. In the present case, this forms the guide device for guiding part 1 relative to the wall 5. This guide device also maintains the minimum deformation of the O-ring 11 ensuring tightness. When the manipulator rod 2 tilts relative to the wall 5, the O-ring 11 is deformed to a greater extent on one side, but is deformed to a lesser extent on the opposite side relative to the initial position. The minimum deformation of the O-ring ensuring tightness is achieved also at the least deformed location of the O-ring. The guide device by which a minimum axial pressing force is maintained on the O-ring all along its circumference is accordingly formed in this embodiment example by the parts defining the swiveling axis 14 and by a stop which is provided, if necessary, for limiting the tilting of the manipulator rod 2.

Figure 5:
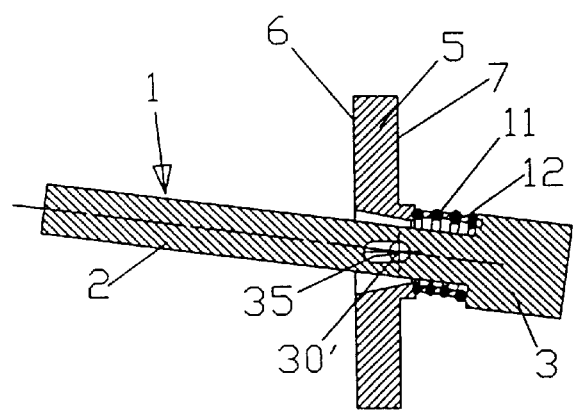
FIG. 5 shows a longitudinal section through a third embodiment example of the invention.

In the embodiment example of the invention which is shown in FIG. 5 and which is modified somewhat compared with that in FIGS. 3 and 4, a plurality of O-rings 11 are again provided. Oppositely located elongated holes 35 which extend in axial direction of the manipulator rod are provided at the manipulator rod, pins 30' that are rigidly connected with the wall 5 project into these elongated holes 35. This enables a swiveling as well as a smaller linear displacement of the manipulator rod.

Figure 6:
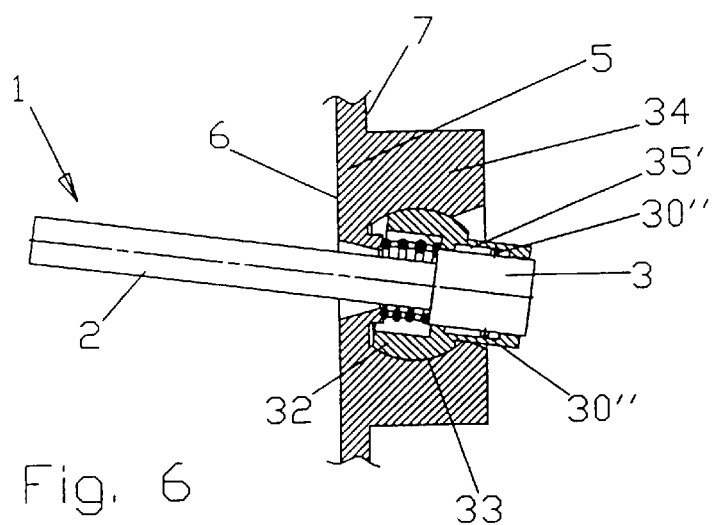
FIG. 6 shows a schematic longitudinal section through a fourth embodiment example of the invention.

In the embodiment example of the invention shown in FIG. 6, universal ball joints 32 which are guided in ball surfaces 33 are provided for the swivel bearing support of the part 1. The ball surfaces 33 are provided at guide parts 34 which are rigidly connected with the wall. Part 1 is linearly displaceable relative to the universal ball joints in one area, namely, by means of elongated holes 35' in a guide part rigidly connected with the universal ball joints 32, wherein pins 30'' arranged on both sides of the actuating handle project into this guide part.

Figure 7:
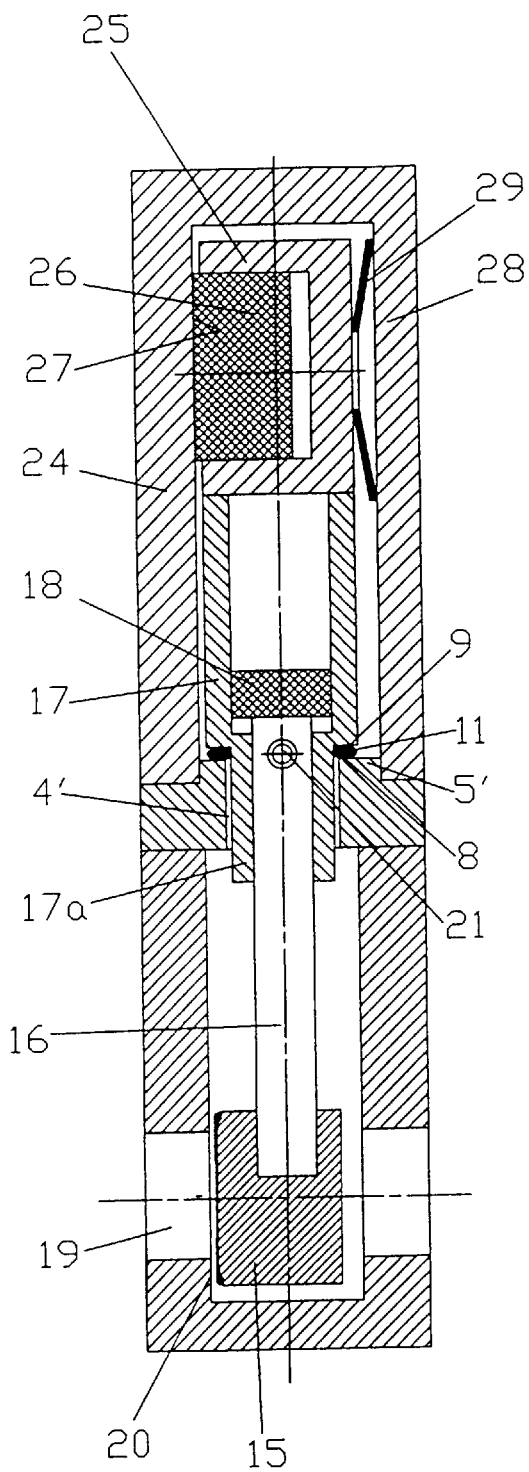
FIGS. 7 and 8 show schematic sections along line A—A of FIG. 9 of a fifth embodiment example of the invention, wherein the vacuum pipe is provided in a vacuum valve and the valve is in different positions.
Figure 8:
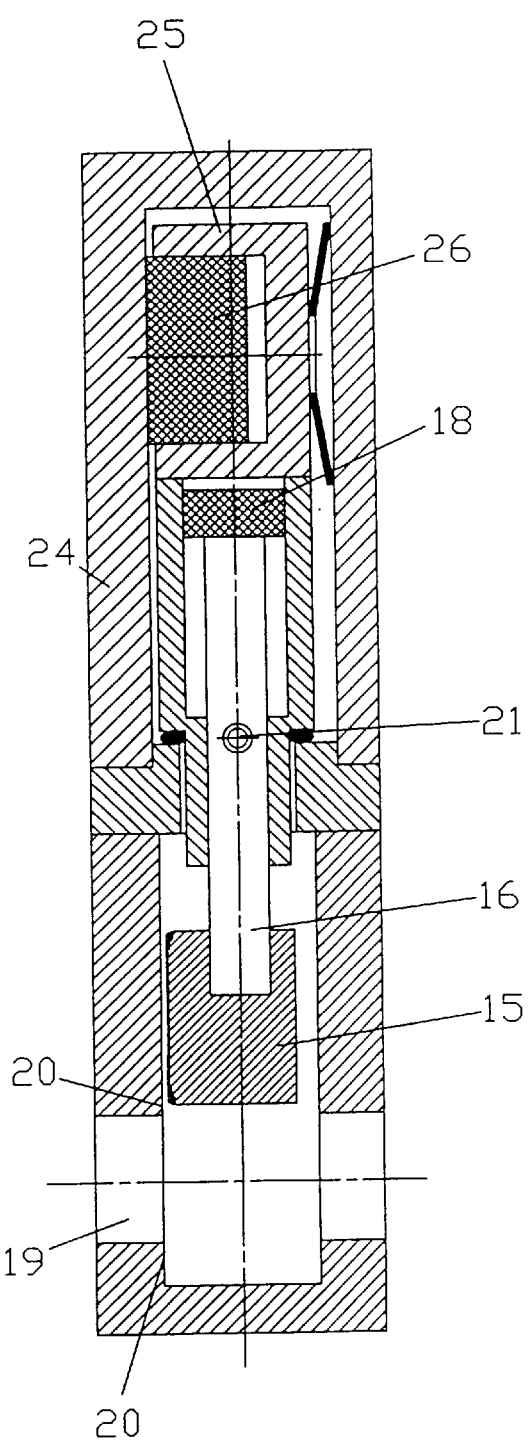
Figure 9:
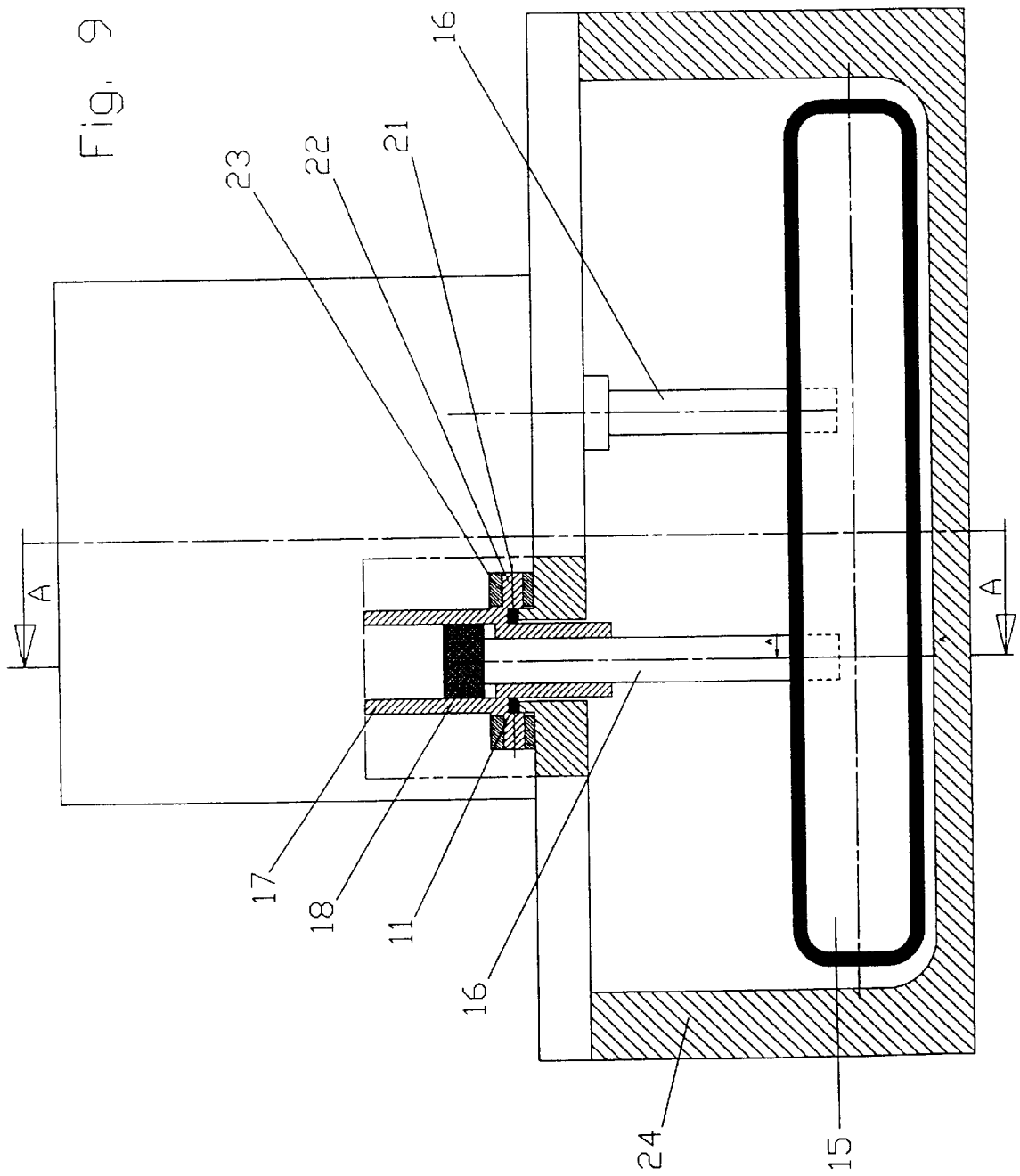
FIG. 9 shows a front view of this vacuum part, partially in section.

In the embodiment example of the invention shown in FIGS. 7 to 9, the vacuum pipe is provided in a vacuum valve. The vacuum valve comprises a valve plate 15 which is fixed to valve rods 16. The valve rods 16 are guided in a collar 17a at a cylinder 17 with slight radial play and are fixed to the piston 18 of the cylinder 17. By means of the piston 18, the valve plate can be displaced from a position (see FIG. 8) releasing the valve opening 19 into a position which is located opposite to the valve opening 19, but which is lifted from the valve seat 20 surrounding the valve opening 19. The cylinder 17 is supported so as to be swivelable about a pivot 21. Pins 22 which protrude radially at both sides of the cylinder 17 and which are received in corresponding recesses 23 in the valve housing are provided for this purpose.

Another cylinder 25 is rigidly connected with the cylinder 17 and has a piston 26 which acts at right angles to the valve rod 16 and to the pivot 21 and which is shown schematically in FIGS. 6 and 7 as a plunger and whose end projecting out of the cylinder 25 is supported at the inner wall 27 of the valve housing 24. A spring 29, for example, a disk spring, is arranged between the cylinder 25 and the wall 28 of the valve housing on the side of the cylinder 25 located opposite the inner wall 27 and pretensions the cylinder 25 and cylinder 17 in the swiveling position shown in FIG. 7 around the pivot 21. The cylinder 25 and cylinder 17 are swiveled about pivot 21 by actuating the piston 26, so that the seal arranged at the valve plate is pressed against the sealing surface arranged at the valve seat 20.

The linear leadthrough for the respective valve rod 16 from the vacuum region into the cylinder 17 is constructed in conventional manner. For example, a sealing ring can be provided for this purpose at the inner surface of the collar 17a, this sealing ring sealing the collar 17a relative to the valve rod 16. A bellows extending between the front side of the collar 17a and the valve plate 15 could also be used for sealing.

The tilting leadthrough which makes it possible for the cylinder 17 to swivel about the axis 21 while sealing the cylinder 17 relative to the valve housing comprises a sealing ring in the form of an O-ring 11 which is pressed in axial direction. This sealing ring is located between sealing surfaces 8 and 9. Sealing surface 8 is arranged at the outer side of the wall 5' of the valve housing 24 defining the vacuum, this outer side facing away from the vacuum, and surrounds the opening 4' in this wall 5' annularly. The annular sealing surface 9 is arranged at the part projecting through the opening 4' into the vacuum from outside of the vacuum, which part is formed in the present instance by the cylinder 17 and its collar 17a. The guide device is formed by parts determining the axis 21, together with the parts limiting the swiveling about the axis 21. In the untilted position of the cylinder 17, the O-ring 11 is uniformly deformed along its circumference, wherein there is a "medium" deformation of the O-ring. When the cylinder 17 is tilted, a greater deformation of this O-ring occurs on one side of the O-ring 11 and a smaller deformation occurs on the opposite side, wherein the minimum deformation ensuring tightness is still provided. The axis 21 extends through the central region of the O-ring 11 (see FIG. 9).

The actuating device for the displacement of the valve plate 15 could also be formed in a manner other than that shown, for example, corresponding to the prior art cited in the introductory part of the specification. The type of construction of this actuating device is not the subject of the present invention.

The field of the invention is not limited to the embodiment examples shown herein, but should be understood in relation to the attached claims together with the full range of possible equivalents.

While the foregoing description and drawings represent the present invention, it will be obvious to those skilled in the art that various changes may be made therein without departing from the true spirit and scope of the present invention.

| Reference Numbers | |
|---|---|
| 1 | part |
| 2 | manipulator rod |
| 3 | actuating handle |
| 4, 4' | opening |
| 5, 5' | wall |
| 6 | inner side |
| 7 | outer side |
| 8 | sealing surface |
| 9 | sealing surface |
| 10 | sealing arrangement |
| 11 | O-ring |
| 12 | intermediate ring |
| 13 | stop |
| 14 | swiveling axis |
| 15 | valve plate |
| 16 | valve rod |
| 17 | cylinder |
| 17a | collar |
| 18 | piston |
| 19 | valve opening |
| 20 | valve seat |
| 21 | pivot or axis |
| 22 | pin |

| -continued | |
|---|---|
| Reference Numbers | |
| 23 | recess |
| 24 | valve housing |
| 25 | cylinder |
| 26 | piston |
| 27 | inner wall |
| 28 | wall |
| 29 | spring |
| 30, 30', 30" | pin |
| 31 | guide part |
| 32 | universal ball joint |
| 33 | ball surface |
| 34 | guide part |
| 35, 35' | elongated hole |

What is claimed is:

1. A vacuum pipe for a part which is mounted so as to be movable and projects from outside a vacuum chamber into a vacuum in the vacuum chamber, comprising:
    an opening in a wall of the vacuum chamber limiting the vacuum, with an inner side facing the vacuum and an outer side at which is provided an annular sealing surface surrounding the opening;
    an annular sealing surface at the part projecting through the opening into the vacuum from outside the vacuum;
    a sealing arrangement which is provided between the annular sealing surfaces of the wall and of the part and which comprises at least one sealing ring of elastic material; and
    a guide device which guides the part relative to the wall and by which at least a minimum axial pressing force is maintained on the at least one sealing ring in every position of the part, resulting in a deformation of the at least one sealing ring such that tightness is ensured, wherein the deformation of the sealing ring changes at least in areas of the sealing ring when the part moves relative to the wall.

2. The vacuum pipe according to claim 1, wherein the guide device comprises and/or is formed by a swivel bearing support of the part forming a swiveling axis.

3. The vacuum pipe according to claim 1, wherein the guide device comprises and/or is formed by a guide surface guiding the part axially and a stop which limits the maximum distance between the sealing surfaces of the wall and part.

4. The vacuum pipe according to claim 1, wherein the guide device comprises a universal ball joint which is guided in a ball surface rigidly connected with the wall and in which the part (1) is guided linearly and is displaceable about a displacement distance.

5. The vacuum pipe according to claim 1, wherein the guide device comprises elongated holes which are arranged on opposite sides of the part and into which pins that are rigidly connected with the wall project.

6. The vacuum pipe according to claim 1, wherein two or more sealing rings of elastic material are provided, an inelastic intermediate ring being arranged therebetween in each instance, which intermediate ring has oppositely located lateral surfaces contacted by the sealing rings and forming sealing surfaces.

7. A vacuum valve comprising:
    a valve opening which is provided in a valve housing and is surrounded by a valve seat;
    a valve plate which is arranged on at least one valve rod and can close the valve opening in the closed state of the valve;

an actuating device by which the valve plate can be displaced from its open position releasing the valve opening initially into a position which is located opposite the valve opening, but which is lifted from the valve seat; and can be subsequently moved against the valve seat by the valve rod swiveling about an axis and can be pressed against this valve seat;

a vacuum pipe for a part surrounding the valve rod, by which the part surrounding the valve rod is guided out of the vacuum and which enables the part surrounding the valve rod to swivel together with the valve rod, wherein the vacuum pipe comprises:

an opening in a wall of the vacuum chamber limiting the vacuum, with an inner side facing the vacuum and an outer side at which is provided an annular sealing surface surrounding the opening;

an annular sealing surface at the part which surrounds the valve rod and which projects through the opening into the vacuum from outside the vacuum and which faces the sealing surface surrounding the opening;

a sealing arrangement which is provided between the annular sealing surfaces of the wall and the part surrounding the valve rod and which comprises at least one sealing ring of elastic material; and a guide device which guides the part surrounding the valve rod relative to the wall and by which at least a minimum axial pressing force is maintained on the at least one sealing ring in every position of the part surrounding the valve rod, resulting in a deformation of the at least one sealing ring such that tightness is ensured, wherein the deformation of the sealing ring changes at least in areas of the sealing ring when the part surrounding the valve rod moves relative to the wall.

8. The vacuum valve according to claim 7, wherein the respective valve rod is rigidly connected with a piston of a piston-cylinder unit.

9. The vacuum valve according to claim 8, wherein the part surrounding the valve rod is rigidly connected with the cylinder of the piston-cylinder unit.

10. The vacuum valve according to claim 9, wherein the valve rod is guided in axial direction and with a slight radial play in the part surrounding the valve rod.

11. The vacuum valve according to claim 10, wherein a linear leadthrough is formed between the part surrounding the valve rod and the valve rod for guiding the valve rod in a sealed manner from outside the vacuum into the vacuum.

* * * * *